United States Patent [19]

Miyazaki

[11] Patent Number: 5,193,195

[45] Date of Patent: Mar. 9, 1993

[54] MICROCOMPUTER HAVING EASILY TESTABLE INTERRUPT CONTROLLER

[75] Inventor: Takashi Miyazaki, Tokyo, Japan

[73] Assignee: NEC Corporation, Tokyo, Japan

[21] Appl. No.: 586,789

[22] Filed: Sep. 21, 1990

[30] Foreign Application Priority Data

Sep. 22, 1989 [JP] Japan .................................. 1-246704

[51] Int. Cl.⁵ ............................................. G06F 9/00
[52] U.S. Cl. ........................... 395/725; 364/238.2; 364/241.2; 364/241.6; 364/242.1; 364/DIG. 1; 364/941; 364/941.7; 364/DIG.2; 371/16.1
[58] Field of Search ... 364/200 MS File, 900 MS File, 364/238.2, 241.2, 241.6, 242.1, DIG. 1, 941, 941.7, DIG. 2; 371/22.1, 22.5, 15.1, 16.1, 16.4, 25.1, 22.6; 395/725

[56] References Cited

U.S. PATENT DOCUMENTS

| | | | |
|---|---|---|---|
| 4,004,283 | 1/1977 | Bennett et al. | 364/200 |
| 4,124,888 | 11/1978 | Washburn | 364/200 |
| 4,438,492 | 3/1984 | Harmon, Jr. et al. | 395/375 |
| 4,648,029 | 3/1987 | Cooper et al. | 395/325 |
| 4,716,523 | 12/1987 | Burrus, Jr. et al. | 395/425 |
| 5,101,497 | 3/1992 | Culley et al. | 395/725 |

FOREIGN PATENT DOCUMENTS

63-310035 4/1989 Japan .

OTHER PUBLICATIONS

IBM Technical Disclosure Bulletin, vol. 29, No. 9, Feb. 1987 Interrupt Controller Diagnostic Wrap Arrangement, pp. 3871-3872.

*Primary Examiner*—Michael R. Fleming
*Assistant Examiner*—Glenn A. Auve
*Attorney, Agent, or Firm*—Whitham & Marhoefer

[57] ABSTRACT

A microcomputer includes a plurality of external terminals, an internal bus, a central processing unit coupled to the internal bus, an input/output interface connected to the external terminals and the internal bus for controlling data transfer between the microcomputer and an external device under control of the central processing unit, an interrupt request source connected to the internal bus, and an interrupt controller coupled to the internal bus and receiving an interrupt request signal from the interrupt request source so as to generate an interrupt processing request signal to the central processing unit. The interrupt controller includes a switch circuit connected to receive a vector code output enable signal and an interrupt enable signal from the central processing unit and corresponding signals from the internal bus. The switch circuit is controlled by a test mode signal supplied through one of the external terminals, so as to output the vector code output enable signal and the interrupt enable signal when the test mode signal is inactive and to output the corresponding signals from the natural bus as the vector code output enable signal and the interrupt enable signal when the test mode signal is active.

10 Claims, 4 Drawing Sheets

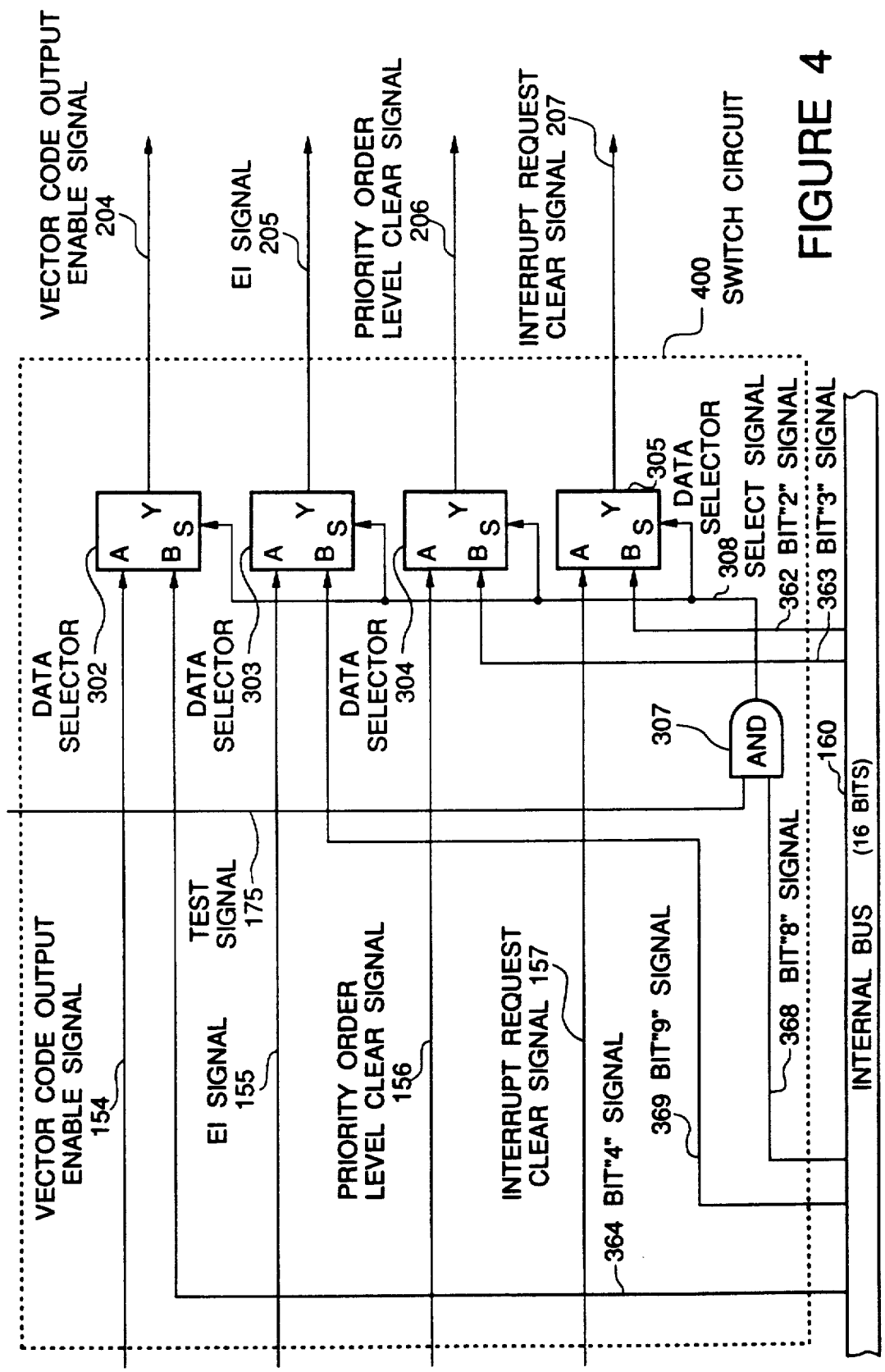

MICROCOMPUTER HAVING EASILY TESTABLE INTERRUPT CONTROLLER

BACKGROUND OF THE INVENTION

1. Field of the Invention

The present invention relates to a microcomputer, and more specifically, a microcomputer including a interrupt controller requesting an interrupt processing to an central processing unit in response to an interrupt request signal outputted from peripheral hardware.

2. Description of Related Art

Recently, microcomputers have been used in many and different fields. Particularly, single-chip microcomputers have been widely used or incorporated in a home use field including air conditioners and electric rice cookers, and in various control instruments including robots and motor controllers, since the single-chip microcomputers are inexpensive for the reason that a central processing unit (called "CPU" hereinafter), a RAM (random access memory), a ROM (read only memory) and peripheral devices are integrated on a single chip.

As mentioned above, since the single-chip microcomputer includes the CPU and the peripheral hardware therein, the single-chip microcomputer also includes therein an interrupt controller for controlling an interrupt request from the peripheral hardware.

In general, the interrupt controller has the following functions:

(1) To receive an interrupt request from each peripheral hardware, and to request an interrupt processing to the CPU;

(2) To inform the CPU of a location storing a head address of an interrupt processing program (called a "vector code" hereinafter); and (3) To discriminate the order of priority when a plurality of interrupt requests are generated or when a separate interrupt request is generated in the course of execution of a processing for one interrupt request, and to accept or acknowledge an interrupt request having the highest order of priority.

In the above mentioned conventional single-chip microcomputer including the interrupt controller therein, when the internal interrupt controller is tested by use of a so-called LSI tester, a test pattern is prepared in the following manner while causing the CPU to execute instructions.

(a) Determine whether or not the interrupt controller had requested an interrupt processing to the CPU in response to an interrupt request outputted from the peripheral hardware, is checked by writing specific values to an input/output interface by means of execution of an instruction in the execution course of an interrupt processing program performed as the result of acknowledgement of the interrupt processing request by the CPU, and by examining whether or not values appearing on external terminals of the single-chip microcomputer change in accordance with the interrupt processing program;

(b) Determine whether or not the priority order control is properly executed is checked by making contents of the interrupt processing programs different from one another for each interrupt request source, and monitoring which of the interrupt processing programs is executed by the CPU; and (c) Change of a priority level hold register and changes of interrupt flags caused by an interrupt request clear signal are checked by reading the priority level hold register and the interrupt flags by means of execution of an instruction, and then writing the read data to the input/output interface by means of execution of an instruction, so that values appearing on external terminals of the single-chip microcomputer will change.

As seen from the above, in the test of the internal interrupt controller of the conventional single-chip microcomputer, since it is necessary to write data to the input/output interface so as to cause the data to be outputted from the external terminals, it is necessary to previously initialize the input/output interface so that change of the data on the external terminals can be easily discriminated or detected. Therefore, the number of test patterns inevitably becomes large.

Since several clock cycles are required after the interrupt controller outputs the interrupt processing request signal to the CPU until the CPU executes a first instruction of a requested interrupt processing program, there will inevitably exist a number of patterns independent of the internal test of the interrupt controller.

To test the speed of critical paths within the interrupt controller, it is necessary to continuously monitor the execution timing of each instruction by the CPU while increasing the execution speed. This requires a sufficiently long test pattern which is difficult, if not impossible, to prepare.

The above problems become more serious if the number of interrupt request signals generated by the peripheral hardware increases. In addition, the time for executing the test becomes long, and also, the time for preparing the test pattern becomes long. As a result, a total chip cost for microcomputers is increased.

SUMMARY OF THE INVENTION

Accordingly, it is an object of the present invention to provide a microcomputer which has overcome the above mentioned defect of the conventional one.

Another object of the present invention is to provide a microcomputer including therein an interrupt controller which can be tested for a shortened time and which makes it possible to efficiently prepare a required test pattern having a high defect detection rate.

The above and other objects of the present invention are achieved in accordance with the present invention by a microcomputer including a plurality of external terminals, an internal bus, a central processing unit coupled to the internal bus, an input/output interface connected to the external terminals and the internal bus for controlling data transfer between the microcomputer and an external device under control of the central processing unit, an interrupt request source connected to the internal bus, and an interrupt controller coupled to the internal bus and receiving an interrupt request signal from the interrupt request source so as to generate an interrupt processing request signal to the central processing unit. The interrupt controller includes a switch circuit connected to receive a vector code output enable signal and an interrupt enable signal from the central processing unit and corresponding signals from the internal bus. The switch circuit is controlled by a test mode signal supplied through one of the external terminals, so as to output the vector code output enable signal and the interrupt enable signal when the test mode signal is inactive and to output the corresponding signals from the internal bus as the vector code output enable signal and the interrupt enable signal when the test mode signal is active.

The above and other objects, features and advantages of the present invention will be apparent from the following description of preferred embodiments of the invention with reference to the accompanying drawings.

BRIEF DESCRIPTION OF THE DRAWINGS

FIG. 4 is a block diagram of a modified example of the switch circuit incorporated in the interrupt controller shown in FIG. 2.

DESCRIPTION OF THE PREFERRED EMBODIMENTS

Now, embodiments of the present invention will be described with reference to the accompanying drawings. The following description will be made on embodiments in which the number of interrupt request sources handled by an interrupt controller included in a microcomputer is 8, and the number of levels of priority is 3.

Figure 1:
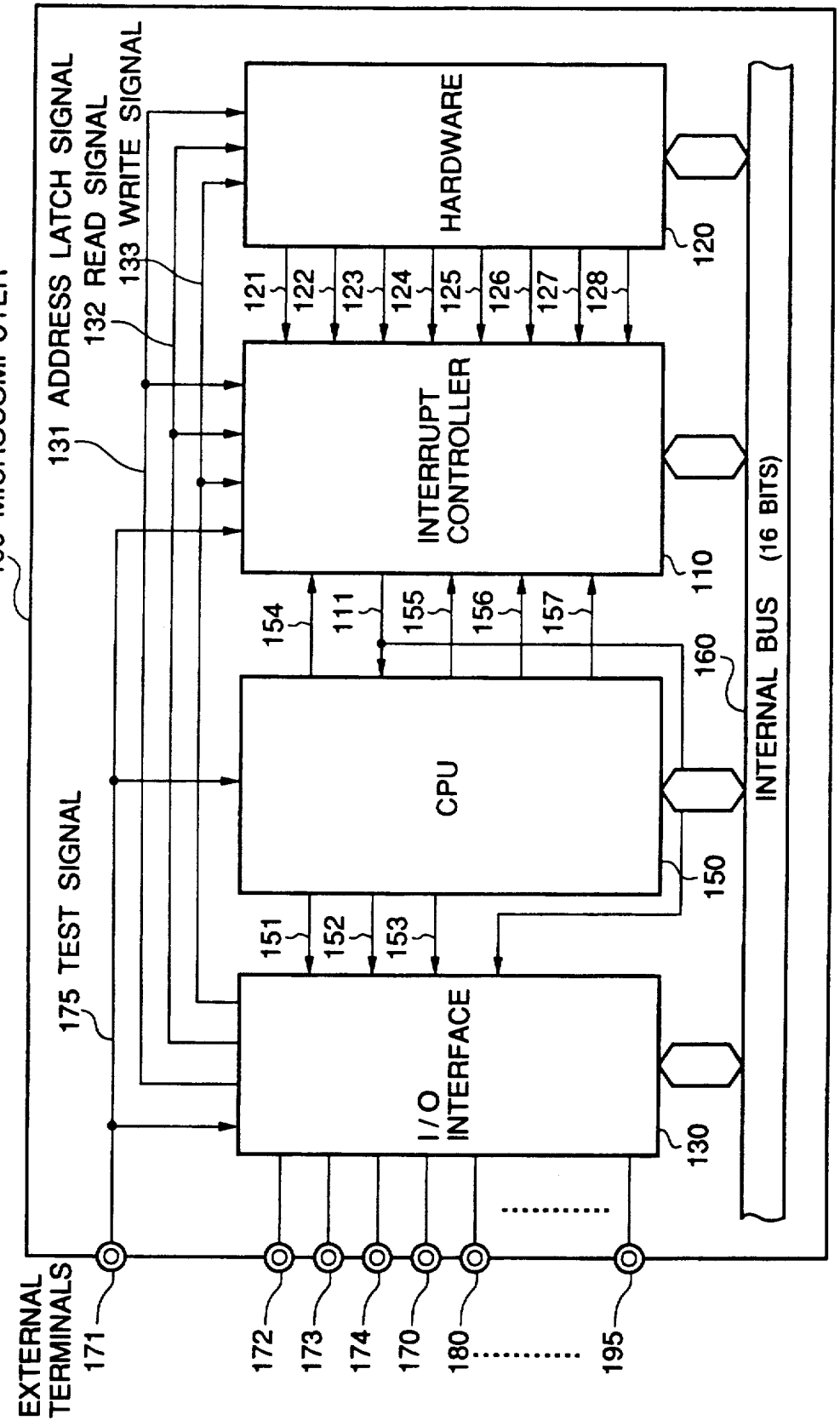
FIG. 1 is a block diagram of a first embodiment of the microcomputer in accordance with the present invention.

Referring to FIG. 1, there is shown a block diagram of a first embodiment of the microcomputer in accordance with the present invention. In addition, FIG. 2 shows a block diagram of the interrupt controller incorporated in the microcomputer shown in FIG. 1, and FIG. 3 shows a block diagram of the switch circuit incorporated in the interrupt controller shown in FIG. 2.

As shown in FIG. 1, a microcomputer generally designated by Reference Numeral 100, is mainly constituted of a CPU 150, an interrupt controller 110, peripheral hardware 120, an I/O (input/output) interface 130 for transferring data between the microcomputer 100 and external devices, and external terminals 170 to 174 and 180 to 195. The CPU 150, the interrupt controller 110, the peripheral hardware 120, the I/O interface 130 are coupled to one another through a 16-bit internal address/data multiplexed bus 160 (called an "internal bus" hereinafter) composed of bit "0" to bit "15". In addition, the CPU 150 supplies the I/O interface 130 with an internal address latch enable signal 151 indicating that an address is outputted on the internal bus 160, a read signal 152 for reading out data to the internal bus 160 and a write signal 153 for writing the data outputted on the internal bus 160. The signal 151 will be called simply an "address latch signal" hereinafter. On the other hand, the I/O interface 130 outputs an address latch signal 131, a read signal 132 and a write signal 133 to the interrupt controller 110 and the peripheral hardware 120. The external terminal 171 is connected to the I/O interface 130, the CPU 150 and the interrupt controller 110 so as to supply a test signal 175 to these circuits.

Furthermore, the interrupt controller 110 outputs an interrupt processing request signal 111 to the CPU 150 and the I/O interface 130. The I/O interface 130 outputs the interrupt processing request signal 111 to the external terminal 170 when the test signal 175 is active. The CPU 150 supplies the interrupt controller 110 with a vector code output enable signal 154 for requesting an output of a vector code, an interrupt enable signal EI 155 indicating that the CPU 150 is in a condition capable of accepting or acknowledging an interrupt request, an interrupt request clear signal 157 for clearing an acknowledged interrupt request after the interrupt request from the interrupt controller 110 is acknowledged, and a priority order level clear signal 156 for clearing the priority order level of the acknowledged interrupt request when a processing for the acknowledged interrupt is terminated. The peripheral hardware 120 generates interrupt request signals 121 to 128 which request the CPU to perform a data transfer or a data writing. These interrupt request signals 121 to 128 are supplied to the interrupt controller 110.

Figure 2:
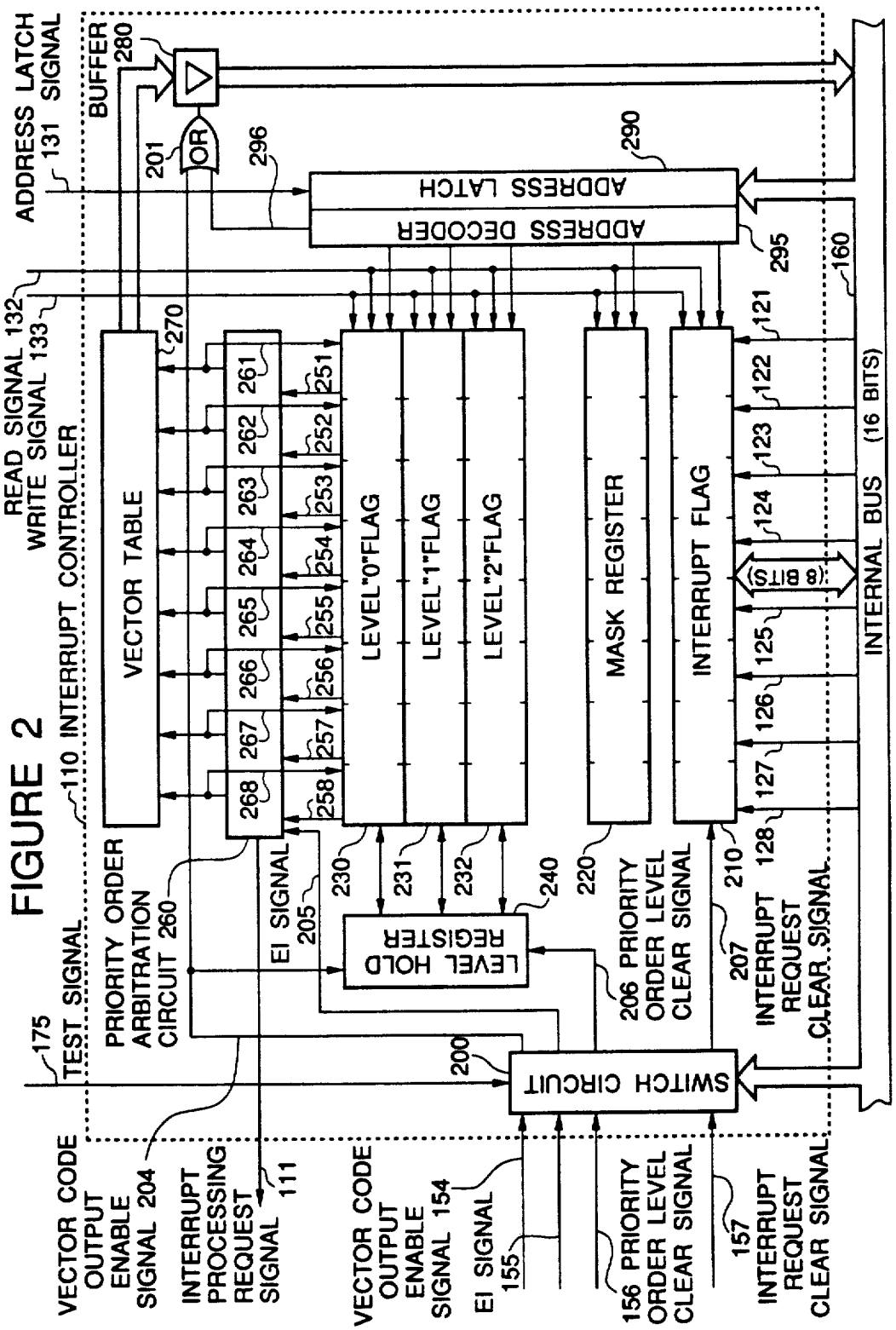
FIG. 2 is a block diagram of the interrupt controller incorporated in the microcomputer shown in FIG. 1.
Figure 3:
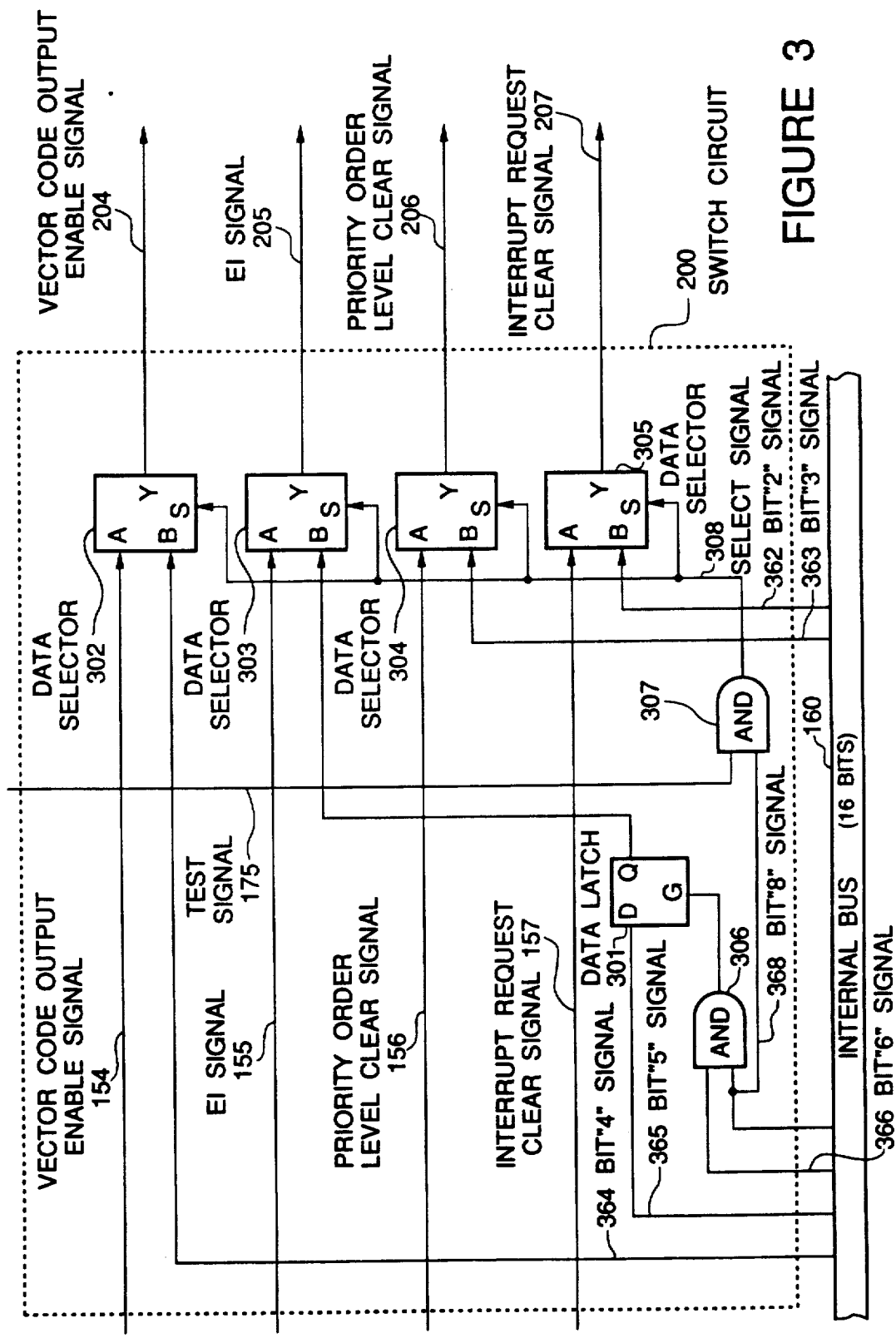
FIG. 3 is a block diagram of the switch circuit incorporated in the interrupt controller shown in FIG. 2.

Referring to FIG. 2, the interrupt controller 110 includes a switch circuit 200 controlled by the test signal 175 so as to select either the vector code output enable signal 154, the EI signal 155, the priority order level clear signal 156 and the interrupt request clear signal 157 or test data outputted on the internal bus 160 and to output the selected signals as an internal vector code output enable signal 204, an internal EI signal 205, an internal priority order level clear signal 206 and an internal interrupt request clear signal 207. The interrupt controller 110 also includes an interrupt flag register 210 provided to correspond to the interrupt request signals 121 to 128, respectively, and to store generation of the interrupt request, and a mask register 220 provided for each of the interrupt request sources for inhibiting generation of the interrupt request. Furthermore, the interrupt controller 110 includes a level "0" flag 230, a level "1" flag 231 and a level "2" flag 232 for designating the level of priority of each interrupt request source. The flags are connected to a level hold register 240 for holding a priority order level of an interrupt request that is currently acknowledged by the CPU. In addition, the flags 230 to 232 output acknowledge request signals 251 to 258 for requesting an interrupt for only interrupt requests having a priority order level higher than the priority order level that is currently acknowledged. The interrupt flag register 210, the mask register 220, the level flags 230 to 232 are coupled to the internal bus so that these flags and register can be read, written and modified through the internal bus 160.

The acknowledge request signals 251 to 258 are supplied to a priority order arbitration circuit 260 provided for arbitrating among the interrupt requests having the same priority order level and for generating a request acceptance signal 261 to 268 indicating which of the interrupt requests is selected as the result of arbitration. The interrupt controller 110 further includes a vector table 270 storing a vector code of each of the interrupt request sources, and controlled by the priority order arbitration circuit 260 so as to output a vector code corresponding to the selected interrupt request. A buffer 280 receives the vector code from the vector table 270 so as to output the received vector to the internal bus 160. Furthermore, the interrupt controller 110 includes an address latch 290 responding to the address latch signal 131 to latch an address outputted on the internal bus 160, and an address decoder 295 for decoding the address latched in the address latch 290. An output of this address decoder 295 is connected through an address line 296 to one input of an OR gate 201, which has the other input connected to receive the vector code output enable signal 204. An output of the OR gate 201 is connected to the buffer 280 as a control signal.

In the above mentioned arrangement, the interrupt flag register 210, the mask register 220, the level "0" flag 230, the level "1" flag 231 and the level "2" flag 232 have 8 bits corresponding to the number of the interrupt request sources, respectively. The level hold register 240 has a width of 3 bits corresponding to the number of levels of the priority order.

As shown in FIG. 3, the switch circuit 200 includes an AND gate 306 receiving a data signal 366 on a bit "6" of the internal bus 160 (called a "bit "6" signal") and a bit "8" signal 368 of the same internal bus 160 so as to output a logical product signal, and a data latch 301 for latching a bit "5" signal 365 of the internal bus 160 when the output of the AND gate 306 is brought into "1". Furthermore, the switch circuit 200 includes another AND gate 307 receiving the bit "8" signal 368 of the internal bus 160 and the test signal 175 so as to output a logical product signal as a select signal 308. A data selector 302 receives the vector code output enable signal 154 and a bit "4" signal 364 of the internal bus 160 and selects either one of the two received signals in accordance with the select signal 308 so as to output the selected signal as the internal vector code output enable signal 204. A data selector 303 receives the EI signal 155 and the output of the data latch 301 and selects either one of the two received signals in accordance with the select signal 308 so as to output the selected signal as the internal EI signal 205. A data selector 304 receives the priority order level clear signal 156 and a bit "3" signal 363 of the internal bus 160 and selects either one of the two received signals in accordance with the select signal 308 so as to output the selected signal as the internal priority order level clear signal 206. A data selector 305 receives the interrupt request clear signal 157 and a bit "2" signal 362 of the internal bus 160 and selects either one of the two received signals in accordance with the select signal 308 so as to output the selected signal as the internal interrupt request clear signal 207.

In the above mentioned interrupt flag register 210, when a interrupt request signal 121 to 128 is generated, a corresponding bit of the interrupt flag 210 is brought to "1". In addition, a bit of the interrupt flag 210 corresponding to an interrupt request acknowledged by the CPU 150 is brought into "0".

The mask register 220 functions to acknowledge or inhibit generation of the interrupt at the level of the interrupt flag 210. When a given bit of the mask register 220 is set to "1", a corresponding bit of the interrupt flag register 210 is inhibited from being brought "1" indicative of generation of the interrupt request. On the other hand, if a given bit of the mask register 220 is set to "0", a corresponding bit of the interrupt flag register 210 is allowed to be brought "1" indicative of generation of the interrupt request.

The level "0" flag 230 is used for designating a priority order level of each of the interrupt request signals 121 to 128 to a level "0". A interrupt request signal corresponding to a bit of the level "0" flag 230 set to "1" is should be understood to have been designated to a priority order level "0".

Similarly, the level "1" flag 231 and the level "2" flag 232 are used for designating a priority order level "1" and a priority order level "2" for corresponding interrupt request signals, respectively.

The level hold register 240 is used for hold a priority order level of an acknowledged interrupt request, and operates to fetch a value of a corresponding bit of each of the respective flags when an interrupt request is acknowledged, and to hold the fetched value until an interrupt processing for the acknowledged interrupt request has been completed. After the interrupt processing for the acknowledged interrupt request has been completed, the level hold register 240 clears the held priority order level of that interrupt request.

The interrupt register 210, the mask register 220, the level "0" flag register 230, the level "1" flag 231, the level "2" flag 232, and the level hold register 240 can be written or read through the internal bus 160 under control of the address latch signal 131, the address latch 290, the address decoder 295, the read signal 132 and the write signal 133.

Each of the acknowledge request signals 251 to 258 is activated so as to request an interrupt, only when the priority order level designated for the corresponding active interrupt request signal 121 to 128 is higher than the priority order level held in the level hold register 240.

The priority order arbitration circuit 260 operates to accept the acknowledge request signals 251 to 258 if the EI signal 250 is "1", and when two or more of the acknowledge request signals 251 to 258 are "1", it arbitrates among the acknowledge request signals of "1". In this embodiment, it is assumed that the smaller the interrupt request signal number is, the higher the priority of the interrupt request signal is. Therefore, if the acknowledge request signals 251 and 252 are simultaneously brought to "1", the acknowledge request signal 251 is selected or acknowledged.

If the test signal 175 is inactive, namely, at "0", the CPU 150 executes an ordinary program, and the I/O interface 130 outputs the address latch signal 151, the read signal 152 and the write signal 153 as the address latch signal 131, the read signal 132 and the write signal 133, respectively. In addition, the data selectors 302 to 305 of the interrupt controller 110 select the vector code output enable signal 154, the EI signal 155, the priority order level clear signal 156 and the interrupt request clear signal 157, which are generated by the CPU 150. In this condition, the I/O interface 130 operates to transfer data between the microprocessor and an external device by used of the external terminals 170, 172 to 174 and 180 to 195 excluding the terminal 171.

Now, operation of various parts will be described after a moment the peripheral hardware 120 generates an interrupt request signal 121 set to the priority order level "0" in the course of execution of a main routine of a program by the CPU 150 until the interrupt processing request signal 111 is brought to "1".

As the result of the generation of the interrupt request signal 121, a corresponding bit "0" (bit number or place) of the interrupt flag register 210 is set to "1" (bit level or value). At this time, if a corresponding bit "0" (bit number) of the mask register 220 is set to "0" (bit level), generation of the interrupt of the interrupt flag register 210 is allowed, so that the corresponding acknowledge request signal 251 is outputted to the priority order arbitration circuit 260. On the contrary, if the corresponding bit "0" (bit number) of the mask register 220 is set to "1" (bit level), generation of the interrupt of the interrupt flag register 210 is inhibited, so that it is prevented from outputting the acknowledge request signal 251 to the priority order arbitration circuit 260 until the corresponding bit "0" (bit number) of the mask register 220 is written with "0" by the CPU 150.

If the EI signal 205 is of "1", the priority order arbitration circuit 260 accepts the acknowledge request signal 251 and activates the interrupt processing request signal 111 into "1" and also the interrupt acknowledge signal 261 into "1" which is indicates that the acknowledge request signal 251 is acknowledged. This interrupt acknowledge signal 261 is supplied to the vector table 270, the level "0" flag 230, the level "1" flag 231, the level "2" flag register 232, and the interrupt flag 210. On the contrary, if the EI signal is of "0", the acceptance of the acknowledge request signal 251 is inhibited until the EI signal is brought to "1".

The vector table 270 responds to the interrupt acknowledge signal 261 to output to the buffer 280 a vector code corresponding to the interrupt request signal 251.

On the other hand, if the CPU 150 detects the activated interrupt processing request signal 111 of "1" outputted from the priority order arbitration circuit 260, the CPU 150 outputs the vector code output enable signal 154 of "1" to the interrupt controller 110 in order to request a vector code required for executing an interrupt processing program. The vector code output enable signal 154 of "1" is supplied through the switch circuit 200 to the buffer 280, and therefore, the buffer 280 outputs the vector code to the internal bus 160. At the same time, the vector code output enable signal 154 or 204 is applied to the level hold register 240, so that the level hold register 240 holds the priority order level "0" of the acknowledged interrupt request 121. Then, the CPU 150 receives the vector code outputted on the internal bus 160, and outputs the interrupt request clear signal 157 so as to clear the acknowledged interrupt request. The interrupt request clear signal 157 is supplied through the switch circuit 200 to the interrupt flag register 210, so that the bit of the interrupt flag register 210 corresponding to the interrupt acknowledge signal (261 to 268) of "1", namely, the bit "0" of the interrupt flag register 210 is cleared. Thus, the CPU 150 starts to execute an interrupt processing program corresponding to the received vector code.

If the CPU 150 has completed execution of the interrupt processing program, the CPU outputs the priority order level clear signal 156 in order to clear the priority order level of the acknowledged interrupt request. The priority order level clear signal 156 is supplied through the switch circuit 200 to the level hold register 240, so that the level hold register 240 is reset.

Now, the interrupt order control will be described. The following description will be based on the assumption that the priority order level "0" is the highest order of the priority, and the priority order level "2" is the lowest order of the priority.

In ordinary cases, the interrupt controller has the order of the priority determined by the hardware (called "default order of priority"). This corresponds to the order of priority determined within the priority order arbitration circuit 260. Namely, as mentioned hereinbefore, when two or more of the acknowledge request signals 251 to 258 are concurrently generated, one of the concurrently generated acknowledge request signals is selected and acknowledged by the priority order arbitration circuit 260 in accordance with the "default order of priority".

A method for designating the order of priority about the interrupt request signal 121 will be explained: When a user wishes to set the order of priority for the interrupt request signal 121 to "0", a corresponding bit "0" (bit number or place) of the level "0" flag 230 is set to "1" (bit level or value). If it is desired to set the order of priority for the interrupt request signal 121 to "1", a corresponding bit "0" (bit number) of the level "1" flag 231 is set to "1" (bit level), or if it is desired to set the order of priority for the interrupt request signal 121 to "2", a corresponding bit "0" (bit number) of the level "2" flag 232 is set to "1" (bit level). In a similar manner, the priority order for the other interrupt request signals 122 to 128 can be set to any level of the level "0" to the level "2".

When the interrupt request signal 121 is generated, the corresponding bit "0" of the interrupt flag register 210 is set to "1". Furthermore, the priority order level of the interrupt request signal 121 set in the level "0" flag 230 to the level "2" flag 232 are compared with the value of the level hold register 240 which holds the priority order level of the currently acknowledged interrupt request. If the priority order level of the interrupt request signal 121 is higher than the value of the level hold register 240, the acknowledge request signal 251 of "1" is outputted to the priority order arbitration circuit 260.

Therefore, when the CPU 150 is in the course of execution of an interrupt processing program corresponding to the interrupt request signal 122 designated to the priority order level "1", namely, when the level hold register 240 holds the priority order level "1", even if the interrupt request signal 121 designated to the priority order level "2" is generated, since the priority order level of the interrupt request signal 121 is lower than the priority order level "1" held in the level hold register 240, the acknowledge request signal 251 will be never brought to "1" until the CPU 150 has completed the execution of the interrupt processing program corresponding to the interrupt request signal 122, namely until the level hold register 240 is cleared. Under the same condition, on the contrary, if the interrupt request signal 121 designated to the priority order level "0" is generated, since the priority order level of the interrupt request signal 121 is higher than the priority order level "1" held in the level hold register 240, the acknowledge request signal 251 of "1" is outputted to the priority order arbitration circuit 260. At this time, if the CPU 150 is in a condition capable of acknowledging the interrupt (namely, if the EI signal 155 is "1"), the priority order arbitration circuit 260 brings the interrupt processing request signal 111 to "1". Further, the CPU 150 reserves the execution of an instruction of the interrupt processing program corresponding to the interrupt request signal 122, and then, starts to execute an interrupt processing program corresponding to the interrupt request signal 121. Here, the level hold register 240 holds the priority order level "1" of the interrupt request signal 122 and the priority order level "0" of the interrupt request signal 121.

In the above mentioned manner, a user can control the priority order level for each of the interrupt request processings, by setting the level "0" flag 230 to the level "2" flag 232.

Next, operation of various parts will be described when "1" is applied to the external terminal 171 so that the test signal 175 is brought to "1".

If the test signal 175 is brought to "1", the CPU 150 stops execution of the program, and releases the internal bus 160 to the interrupt controller 110, the peripheral hardware 120 and the I/O interface 130.

The I/O interface 130 outputs, as the address latch signal 131, the read signal 132 and the write signal 133, values supplied to the external terminals 172, 173 and 174. In addition, the I/O interface 130 outputs values inputted to the external terminals 188 to 195 to bits "8" to "15" of the internal bus 150. Furthermore, when "0" is inputted to the external terminal 173, namely, when the read signal 132 is inactive, values applied to the external terminals 180 to 187 are outputted through the I/O interface 130 to bits "0" to "7" of the internal bus 160. On the other hand, when "1" is inputted to the external terminal 173, namely, when the read signal 132 is active, values on the bits "0" to "7" of the internal bus 160 are outputted to the external terminals 180 to 187. With this arrangement, it has become possible to read and write internal registers of the interrupt controller 110 and the peripheral hardware through the external terminals 172 to 174 and 180 and 187. On the other hand, the interrupt processing request signal 111 generated by the interrupt controller 110 (the priority order arbitration circuit 260) is outputted through the I/O interface 130 to the external terminal 170.

In addition, when the address decoder 295 of the interrupt controller 110 decodes an address for the buffer 280, the address decoder 295 activates the output address line 296 to "1", so that the buffer 280 outputs the vector code to the internal bus 160.

Furthermore, if the bit "8" signal 368 of the internal bus 160 is "1", namely, if "1" is inputted to the external terminal 188, the select signal 308 is generated in the switch circuit 200, so that the bit "4" signal 364, the output of the data latch 301, the bit "3" signal 363 and the bit "2" signal 362 are outputted as the internal vector output enable signal 204, the internal EI signal 205, the internal priority order level clear signal 205 and the internal interrupt request clear signal 207, respectively. The data latch 301 operates to latch the bit "5" of the internal bus 160 when both the bit "8" signal 368 and the bit "7" signal 366 of the internal bus 160 are "1".

Here, the bit "8" signal 368 of the internal bus 160 is influenced by the values on the bits "0" to "7" of the internal bus 160 which are used when the internal registers of the interrupt controller 110 are read and written. Therefore, it is possible to control the internal vector output enable signal 204, the internal EI signal 205, the internal priority order level clear signal 205 and the internal interrupt request clear signal 207, on the basis of the values applied onto the external terminals 182 to 188.

Thus, when the test mode signal 175 is active, the interrupt flag register 210, the mask register 220, the priority level hold register 240 and the priority level designation flags 230 to 232 can be read and written through the external terminals under the function of the switch circuit and under control of the address latch signal 131, the read signal 132 and the write signal 132 supplied from the external terminals 172 to 174 to the interrupt controller 110 without intermediary of the CPU 150. Therefore, contents of the interrupt flag register 210 and the priority level designation flags 230 to 232 can be modified through the internal bus from the external terminals.

In addition, when the test mode signal 175 is active, the vector code outputted from the buffer 280 is read through the internal bus 160 to the external terminals. Furthermore, a signal indicative of the priority order level of the interrupt request currently acknowledged by the CPU is written to the level hold register 240 through the internal bus from the external terminals.

Accordingly, the test for the interrupt controller 110 is performed as follows:

(i) Whether or not an interrupt request was properly outputted to the CPU 150, is checked by examining the interrupt processing request signal 111 and the vector code outputted to the external terminals.

(ii) The priority order level control is checked by examining the interrupt processing request signal 111 and the vector code outputted to the external terminals for each of the interrupt request sources.

(iii) The change of the internal registers is checked by connecting a register concerned to the external terminals 172 to 174 and 180 to 187.

Referring to FIG. 4, there is shown a block diagram of a modified example of the switch circuit incorporated in the interrupt controller shown in FIG. 2. The switch circuit shown in FIG. 4 is the same as the switch circuit shown in FIG. 2, except that a bit "9" signal 369 of the internal bus 160 is applied directly to the data selector 303, so that the internal EI signal 205 is directly controlled by a value applied to the external terminal 189.

As seen from the above, the microcomputer in accordance with the present invention including therein the interrupt controller is such that when the interrupt controller is tested, it is possible to input and output, from and to the external terminals by means of the switch circuit, the address latch signal, the read signal, the write signal, and various control signals outputted on the internal bus and from the CPU. Therefore, the microcomputer in accordance with the present invention is advantageous over the conventional microcomputer in the following points:

(a) Since it is possible to input and output the internal data of the interrupt controller directly from and to the external terminals of the microcomputer, it is not necessary to previously initialize the input/output interface so that change of the data on the external terminals can be easily discriminated or detected. Therefore, it is possible to decrease the number of test patterns.

(b) Since the vector code outputted from the interrupt controller to the CPU can be outputted to the external terminals, it is possible to check whether or not the interrupt controller has acknowledged the respective interrupt requests, and therefore, there will exist no pattern that is related to an instruction execution operation of the CPU and therefore is independent of the internal test of the interrupt controller.

(c) It is possible to control the interrupt controller at a desired timing from the external terminals, without an instruction execution operation of the CPU. Therefore, when a test is performed to detect a speed defective of a critical path within the interrupt controller, it is not necessary to ceaselessly monitor the timing of execution of each instruction by the CPU. Therefore, the test pattern can be easily prepared for a short time.

(d) Since the control signals to be outputted from the CPU to the interrupt controller are supplied to the interrupt controller through the internal bus which are already provided in the microcomputer, it is possible to restrain increase of the hardware such as increase of wiring for the test.

As seen from the above, the microcomputer in accordance with the present invention including therein the interrupt controller can be tested for a shortened time, and can also make it possible to efficiently prepare a required test pattern having a high defect detection rate. Therefore, the microcomputer can be inexpensively prepared.

The invention has thus been shown and described with reference to the specific embodiments. However, it should be noted that the present invention is in no way limited to the details of the illustrated structures but changes and modifications may be made within the scope of the appended claims.

I claim:

1. A microcomputer comprising:
   a plurality external terminals, one of said external terminals being connected to receive a test mode signal;
   an internal bus;
   a central processing unit coupled to said internal bus;
   an input/output interface connected to said external terminals and to said internal bus, said input/output interface controlling data transfer between the microcomputer and an external device connected to one of said external terminals under control of said central processing unit;
   an interrupt request source connected to said internal bus;
   an interrupt controller coupled to said internal bus, said interrupt controller receiving an interrupt request signal from said interrupt request source and generating an interrupt processing request signal to said central processing unit; and
   a switch circuit connected to receive a vector code output enable signal and an interrupt enable signal from said central processing unit and first and second signals from said internal bus, said switch circuit being controlled by said test mode signal supplied through one of said external terminals to output said vector code output enable signal and said interrupt enable signal to said interrupt controller when said test mode signal is inactive and to output said first and second signals from said internal bus as the vector code output enable signal and the interrupt enable signal to said interrupt controller when said test mode signal is active.

2. A microcomputer claimed as in claim 1 wherein said input/output interface is connected to directly receive said interrupt processing request signal from said interrupt controller, said input/output interface being controlled by said test mode signal so as to output said interrupt processing request signal to one of said external terminals when said test mode signal is active.

3. A microcomputer claimed as in claim 2 wherein said central processing unit is connected to directly receive said test mode signal and operates to stop execution of a program when said test mode signal becomes active.

4. A microcomputer as claimed in claim 3 wherein when said test mode signal is active, said input/output interface outputs an address latch signal, read signal, and a write signal input from said external terminals to said interrupt controller without intervention by said central processing unit.

5. A microcomputer as claimed in claim 4 wherein said interrupt request source can generate a plurality of interrupt request signals and wherein said interrupt controller includes:
   an interrupt request flag register connected to receive and store said plurality of interrupt request signals, said interrupt request flag register being readable and writable by said central processing unit;
   a mask register connected to said interrupt request flag register and operating to inhibit generation of predetermined ones of said interrupt request signals stored in said interrupt request flag register when said mask register is set active, said mask register being readable and writable by said central processing unit;
   a priority level hold register for holding a priority order level of an interrupt request currently acknowledged by the central processing unit, said priority level hold register being readable and writable by said central processing unit;
   a priority order controlling circuit coupled to said priority level hold register and also coupled to receive contents of said interrupt request flag register through said mask register, said priority order controlling circuit operating to output an interrupt processing request signal to said central processing unit and to generate an interrupt acknowledge request signal for an interrupt request signal having a highest priority order;
   a vector table storing a vector code of an interrupt processing program for each one of said plurality of interrupt request signals, said vector table receiving said interrupt acknowledge request signal outputted from said priority order controlling circuit and operating to output a vector code for said received interrupt acknowledge request signal; and,
   a buffer receiving said vector code from said vector table and controlled by said vector code output enable signal from said switch circuit so as to output said vector code to said internal bus.

6. A microcomputer as claimed in claim 5 wherein said priority order controlling circuit includes:
   a priority order level designation register, said priority order level designation register being readable and writable by said central processing unit and coupled to said priority level hold register and also coupled to receive said contents of said interrupt request flag through said mask register, said priority order level designation register operating to output an acknowledge request signal for an interrupt request signal having a priority order higher that the priority order level held in said priority level hold register; and,
   a priority order arbitration circuit coupled to said priority order level designation register for selecting one acknowledge request signal when a plurality of acknowledge request signals are outputted from said priority order level designation register, the selected acknowledge request signal being outputted as said interrupt acknowledge request signal.

7. A microcomputer as claimed in claim 6 wherein when said test mode signal is active, said interrupt request flag register, said mask register, said priority level hold register and said priority level designation register are read and written through said external terminals under control of said switch circuit and under control of said address latch signal, said read signal and said write signal supplied from said external terminals to said interrupt controller without intervention by said central processing unit.

8. A microcomputer claimed in claim 7 wherein when said test mode signal is active, said vector code outputted from said buffer is read through said internal bus to said external terminals under control of said switch circuit.

9. A microcomputer as claimed in claim 8 wherein when said test mode signal is active, contents of said interrupt request flag register and said priority order level designation register are modified through said internal bus from said external terminals under control of said switch circuit and under control of said address latch signal, said read signal and said write signal supplied from said external terminals to said interrupt controller without intervention by said central processing unit.

10. A microcomputer as claimed in claim 9 wherein when said test mode signal is active, a signal indicative of the priority order level of an interrupt request currently acknowledged by the central processing unit is written to said priority level hold register through said internal bus from said external terminals under control of said switch circuit without intervention by said central processing unit.

* * * * *